United States Patent [19]

Leigh-Monstevens et al.

[11] Patent Number: 4,712,640

[45] Date of Patent: Dec. 15, 1987

[54] HYDRAULIC REMOTE CONTROL FOR MOTOR VEHICLE MANUAL SHIFT TRANSMISSION

[75] Inventors: Keith V. Leigh-Monstevens, Troy; David K. Mienko, Clawson, both of Mich.

[73] Assignee: Automotive Products plc, Warwickshire, England

[21] Appl. No.: 811,344

[22] Filed: Dec. 20, 1985

[51] Int. Cl.⁴ ............................................. B60K 20/14
[52] U.S. Cl. ................................. 180/336; 74/473 R
[58] Field of Search ............ 180/336; 74/335, 473 R; 280/661, 668

[56] References Cited

U.S. PATENT DOCUMENTS

| 2,081,527 | 5/1937 | Breese | 74/335 |
| 2,201,971 | 5/1940 | Hey | 74/473 |
| 2,226,821 | 12/1940 | Kempson | 244/226 |
| 2,332,341 | 10/1943 | Price | 74/335 |
| 3,944,013 | 3/1976 | LaPoint | 180/336 |
| 4,026,578 | 5/1977 | Mattson | 280/668 |

FOREIGN PATENT DOCUMENTS

| 3201972 | 8/1983 | Fed. Rep. of Germany | 74/473 R |
| 1334809 | 9/1962 | France | 74/473 R |
| 0084472 | 7/1983 | France | 74/473 R |

Primary Examiner—John J. Love
Assistant Examiner—Karin L. Ferriter
Attorney, Agent, or Firm—Krass & Young

[57] ABSTRACT

A remote control mechanism connects the shifting lever of a motor vehicle to the vehicle gearbox or transmission, and has a drive member connected to the shifting lever, and a driven member operatively connected to the transmission shift rail. The drive member is supported for both linear motion for selecting a gear, and rotary motion for shifting into a gear. The driven member is supported for both linear motion and rotary motion. A push-pull cable transmits the linear motion of the drive member to the driven member, and master and slave hydraulic linear actuators transmit the rotary motion of the drive member to the driven member so that the transmission is responsive to the shifting lever being moved along two perpendicular paths of motion in a gear shifting pattern.

In another embodiment, master and slave hydraulic linear actuators connect the drive and driven members for transmitting both the linear and the rotary motion of the drive member to the driven member.

15 Claims, 8 Drawing Figures

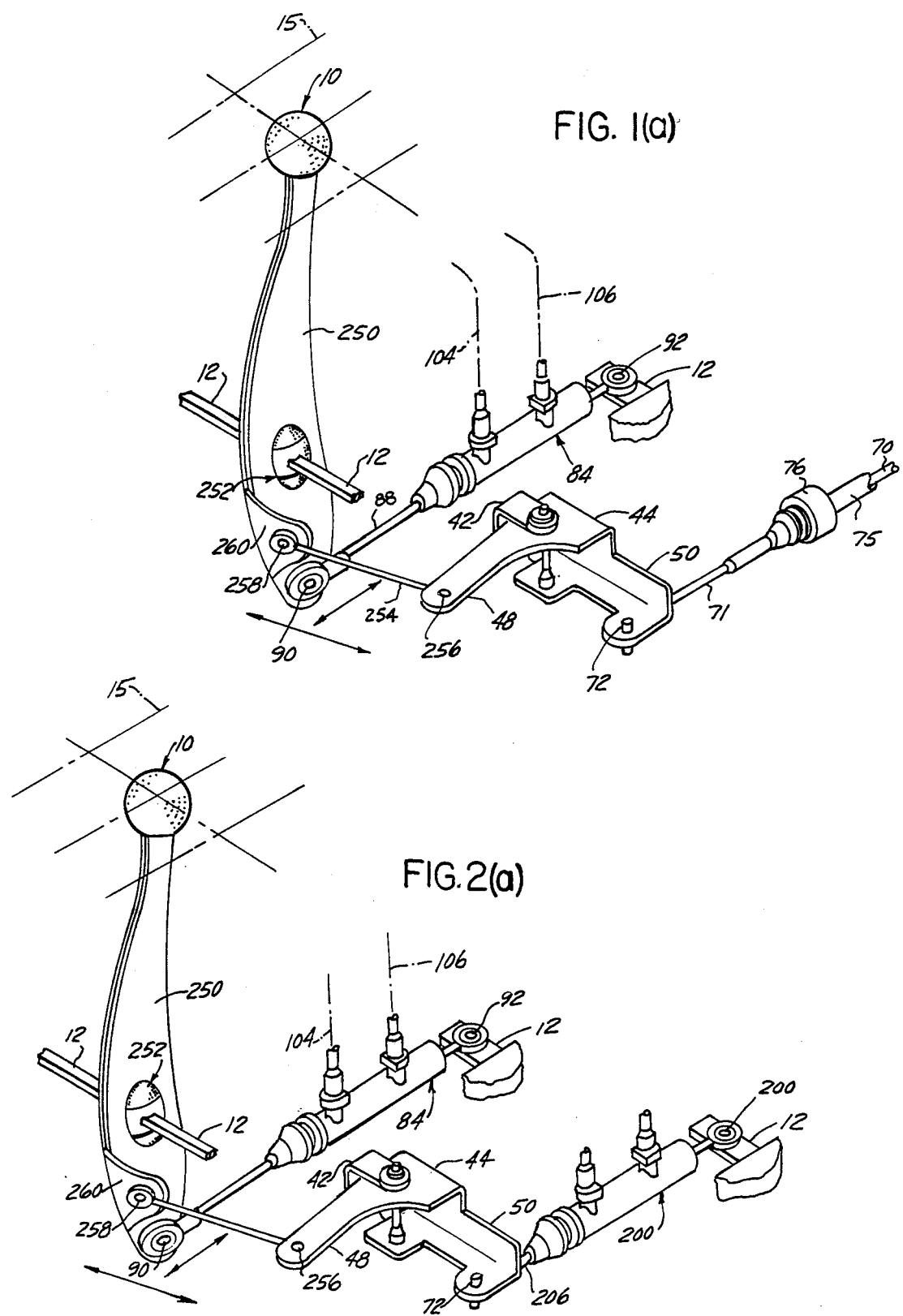

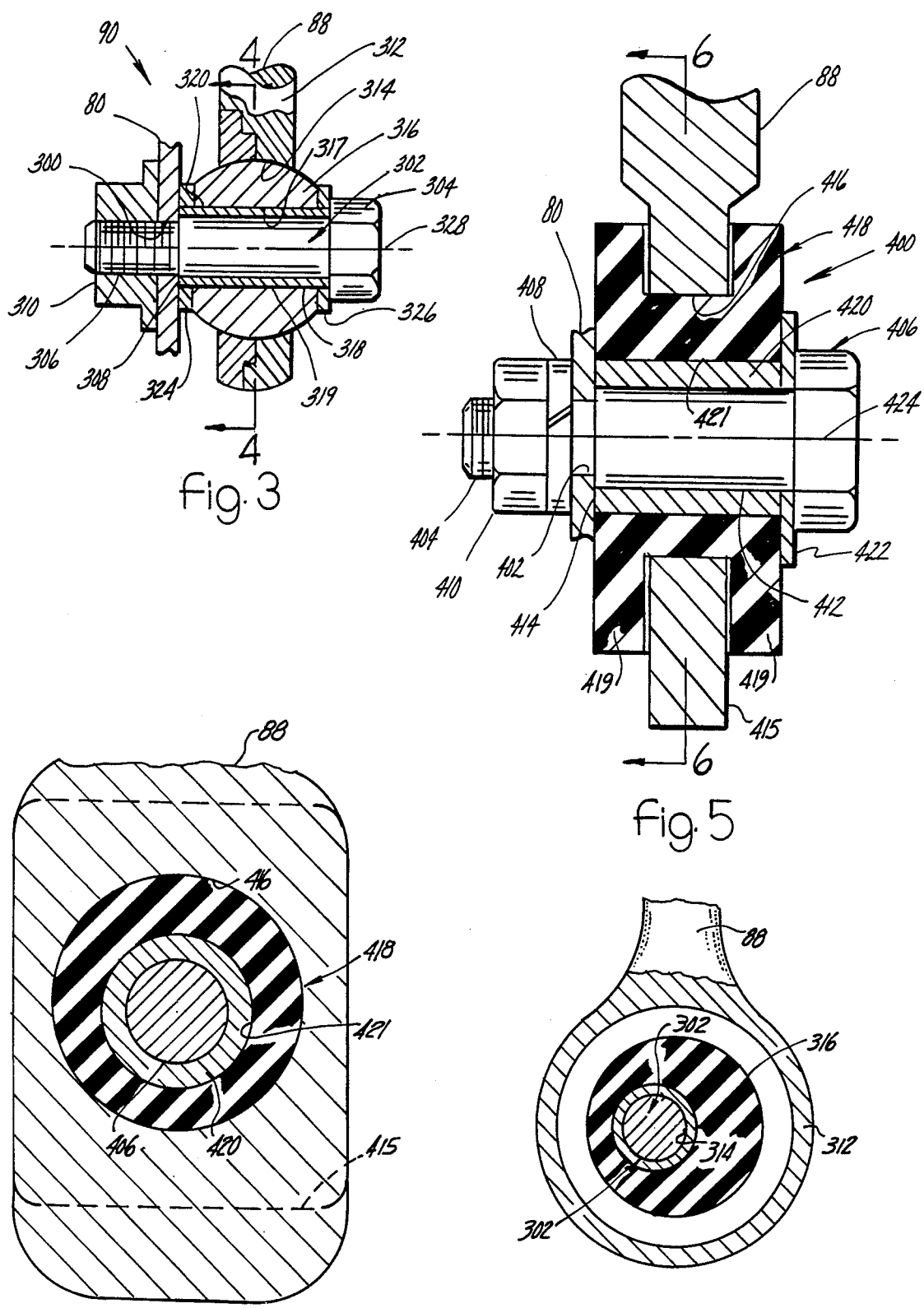

HYDRAULIC REMOTE CONTROL FOR MOTOR VEHICLE MANUAL SHIFT TRANSMISSION

BACKGROUND OF THE INVENTION

Motor vehicles commonly employ a hand-operated shifting mechanism for remotely controlling a device such as a manually shiftable gearbox or transmission. Usually a shift lever or handle is mounted in the passenger compartment so that it can be moved along two mutually perpendicular axes of motion. The lever is moved along one axis or plane to a predetermined position for selecting a pair of transmission gears and then laterally moved along a perpendicular axis or plane either toward one side or the other of the original path of motion to shift into one or the other of the pair of selected gears and to place the transmission in a desired gear ratio.

Gear shift remote control devices of the prior art commonly employ mechanical rods, electrical means and in some instances, hydraulic connections, as disclosed, for example, in U.S. Pat. No. 3,944,013 which issued to Roger F. LaPointe, on Mar. 16, 1976.

SUMMARY OF THE INVENTION

The principal purpose of the present invention is to provide an improved remote control mechanism for a motor vehicle manual gear shift for transmitting motion of a gear shift lever or handle to the transmission gear select and shifting rail.

This and other objects and advantages of the present invention will become apparent to those skilled in the art to which the invention pertains, when the following description of examples of structures for practicing the invention is read in conjunction with the accompanying drawing wherein like reference numerals refer to like or equivalent parts, and in which:

BRIEF DESCRIPTION OF THE DRAWING

FIGS. 1(a) and 2(a) are partial views similar to respectively FIG. 1 and FIG. 2 and showing a modification thereof;

FIG. 3 is an example of pivotal connection at the end of the cylinders or at the end of the piston rods;

FIG. 4 is a section along line 4—4 of FIG. 3;

FIG. 5 is another example of structure for a pivotal connection; and

FIG. 6 is a section along line 6—6 of FIG. 5.

DETAILED DESCRIPTION OF THE PREFERRED EMBODIMENTS

Figure 1:
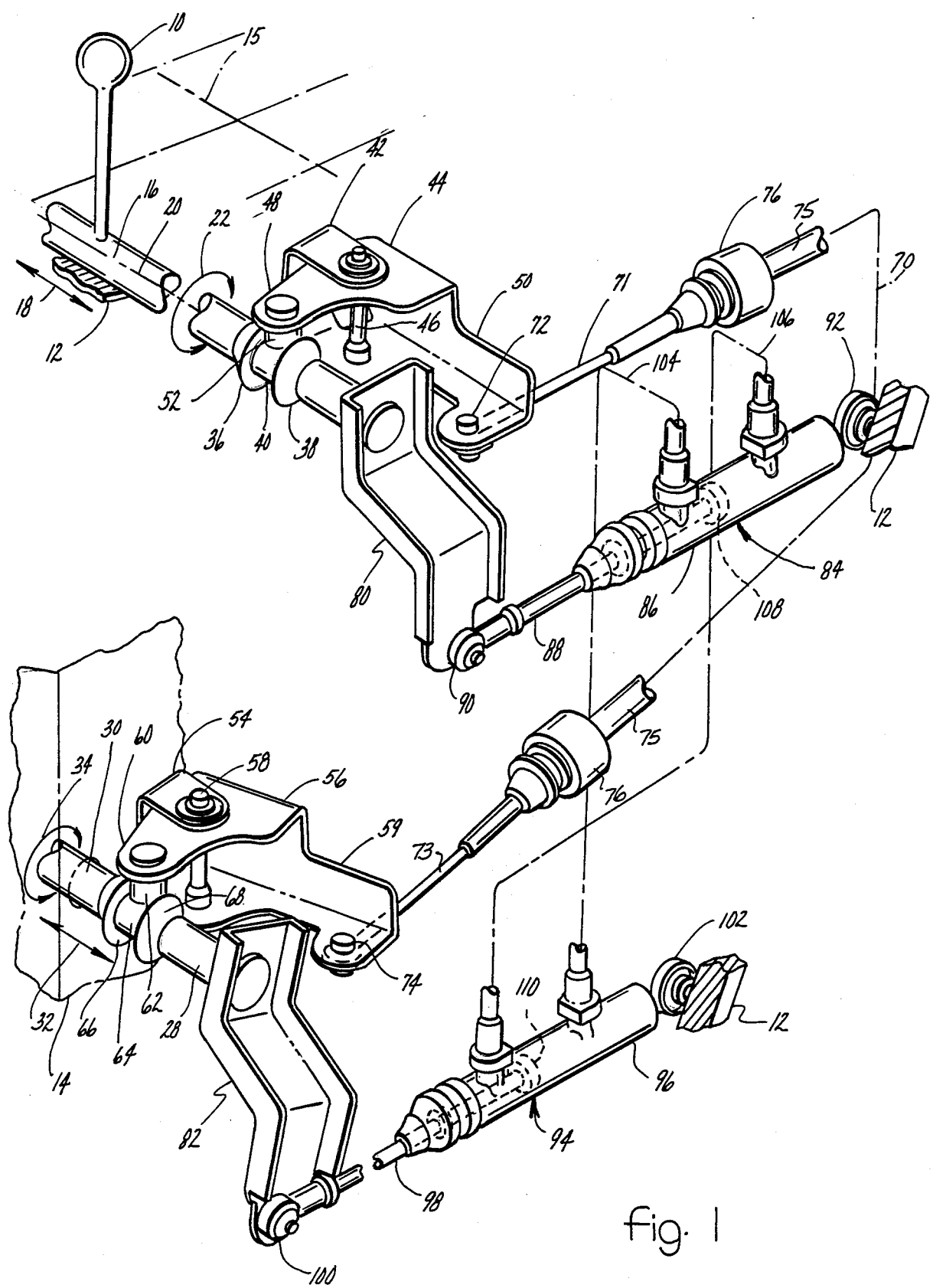
FIG. 1 is a perspective schematic view of a manual transmission control mechanism according to the present invention.
Figure 2:
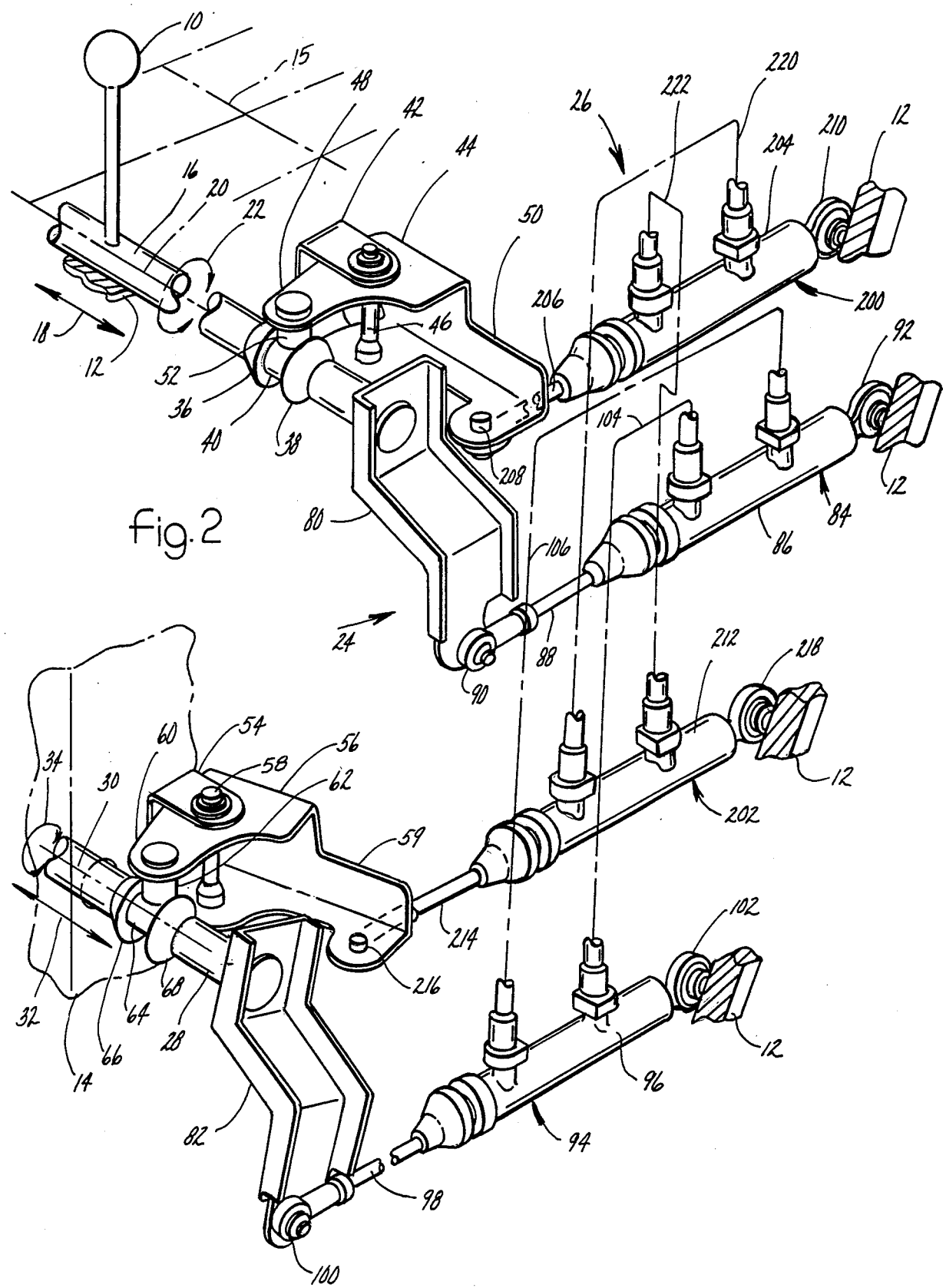
FIG. 2 is a view similar to FIG. 1, but showing a modification thereof.

Referring to FIGS. 1-2 of the drawings, a shift lever or handle 10 is mounted in the driver's compartment of a motor vehicle having a body structure, not shown, and a frame, portions of which are shown at 12, for remotely controlling an apparatus such as a gearbox or transmission 14. As is well known to those skilled in the art, the shift lever or handle 10 is movable in an H or double H gate pattern, schematically shown at 15, along mutually perpendicular axes to select and shift a transmission gear ratio.

In the structure illustrated, the handle 10 is rigidly connected to an elongated drive member 16 slidably mounted relative to the frame 12 for reciprocating motion in a linear direction 18 along its longitudinal axis 20, and in a rotary direction, as shown at 22, around the axis 20. For a typical control motion, the handle is manipulated by the motor vehicle driver so as to move the drive member 16 linearly along the axis 20 to a gear select position. Then the handle 10 is pivoted in a lateral direction to a gear shift position and, in so doing, partially rotates the drive member 16.

The drive member 16 is connected through rotary motion-transmitting means, generally indicated at 24, and linear motion-transmitting means 26 to a driven member 28, or transmission shift rail, which is similar in configuration to the drive member 16. The driven member 28, the gear select shift rail, has an operating portion positioned within the transmission housing and an access portion positioned outside of the housing. The driven member 28 is also movable along a longitudinal axis 30 in a linear direction 32 to a gear select position, and also in a rotary direction 34 about the axis 30 to a gear shift position. The driven member 28 is thus movable in linear and rotary motions that correspond to the linear and rotary motions of the drive member 16 to, respectively, select and shift the transmission into a selected gear.

The drive member 16 has a pair of longitudinally spaced shoulders 36 and 38 forming an annular groove 40. The linear motion transmitting means 26 comprises a generally U-shaped support bracket 42 mounted on the vehicle frame 12 adjacent the drive member 16. An L-shaped lever 44 is pivotally mounted by pin means 46 on the bracket 42 and has a pair of arms 48 and 50 disposed substantially at a right angle. A cam 52 is carried on the arm 48 and is disposed in the drive member groove 40. The cam 52 engages the shoulder 36 when the drive member 16 is moved in one linear direction, and engages the shoulder 38 when the drive member is moved in the opposite linear direction. Thus linear motion of the drive member 16 pivots the lever 44.

A second support bracket 54 is mounted on the housing of the transmission 14 or on the vehicle frame 12 adjacent the driven member 28. An L-shaped lever 56 is pivotally mounted by pin means 58 on the bracket 54. The lever 56 has an arm 59 and an arm 60 disposed at right angles to the arm 59. The arm 60 carries a cam 62 disposed in an annular groove 64 defined by a pair of spaced shoulders 66 and 68 on the driven member 28. The cam 62 is operative to move the driven member 28 as the lever 56 is being pivoted, by engaging either the shoulder 66 or the shoulder 68. Thus the driven member 28 is moved in a linear motion by the pivoting motion of the lever 56.

A motion-transmitting flexible cable 70 has one end attached to a rod 71 connected by pin means 72 to the end of the lever arm 50 and its other end attached to a rod 73 connected by pin means 74 to the end of the arm 59 of lever 56. The cable 70 is enclosed in a flexible sheath or sleeve 75 having end anchoring means 76 fixedly held by bracket means, not shown. Linear displacement of the drive member 16 pivots the lever 44 which in turn either pulls or pushes the cable 70 to pivot the lever 56 and linearly displace the driven member 28.

The rotary motion-transmitting means 24 comprises a bracket or arm 80 attached to the end of the drive member 16, and a similar bracket or arm 82 attached to the end of the driven member 28. The bracket or arm 80 rotates with the drive member 16 about the axis 20.

Similarly, the bracket or arm 82 rotates the driven member about the axis 30.

A hydraulic master cylinder 84 is mounted between the lower end of the bracket or arm 80 and the vehicle frame 12. The master cylinder 84 has a cylinder housing 86 and a piston rod 88 adapted to be extended or retracted with respect to the cylinder. Spherical pivot means 90 connect the end of the piston rod 88 to the end of the arm 80 while similar spherical pivot means 92 connect the end of the housing 86 to the vehicle frame 12. The arrangement is such that as the drive member 16 is rotated about its axis 20 in one direction, the angular displacement of the bracket or arm 80 pushes the piston rod 88 into the cylinder housing 86, and as the drive member 16 is rotated in the opposite direction, the bracket or arm 80 pulls the piston rod 88 from the hydraulic cylinder housing 86.

A slave cylinder linear actuator 94 is mounted between the bracket or arm 82 and the frame 12 proximate the transmission 14. The slave cylinder 94 has a housing 96 and a piston rod 98 reciprocating through one end of the housing 96. Spherical pivot means 100 connect the end of the piston rod 98 to the end of the bracket or arm 82 while spherical pivot means 102 connect the other end of the cylinder housing 96 to the frame 12.

A conduit 104 and a conduit 106 each have one of their ends fluidly connected to the master cylinder housing 86 on opposite sides of an internally and reciprocally mounted piston 108 attached to the piston rod 88. The other ends of conduits 104 and 106 are fluidly connected to the slave cylinder housing 96 on opposite sides of an internally and reciprocally mounted piston 110 attached to the piston rod 98. The arrangement is such that each end of the master cylinder 84 is fluidly connected to the ends of the slave cylinder 94. When the bracket or arm 80 is angularly displaced to displace the master cylinder piston 108, the piston 108 causes fluid in the master cylinder 84 to be exchanged with the fluid in the slave cylinder 94 to reciprocate the slave cylinder piston 110 and thereby produce a corresponding rotary motion of the driven member 28.

For example, assuming the drive member 16 is rotated by the shifting handle 10 in a counterclockwise direction, as viewed in FIG. 1, this motion causes the bracket or arm 80 to push the piston 108 toward the right in the master cylinder housing 86. This motion increases fluid pressure in conduit 106 on one side of the slave piston 110 and reduces fluid pressure in conduit 104, retracting the piston 98 into the slave cylinder 94 and thereby rotating the driven member 28 in a counterclockwise direction. When the drive member 16 is rotated in the opposite direction, the motion-transmitting means 24 causes the driven member to rotate a corresponding distance in a clockwise direction.

The master and slave cylinders and the connecting conduits may be a self-contained, prefilled, pre-bled, hydraulic unit that can be readily mounted in the vehicle on an automotive assembly line.

FIG. 2 illustrates another embodiment of the invention. The components are similarly numbered for the corresponding components illustrated in FIG. 1.

In the embodiment of FIG. 2, the push-pull cable for transmitting the linear gear select motion of the drive member 12 has been replaced by a hydraulic master cylinder 200 and a slave cylinder 202. The master cylinder 200 has a housing 204 from which projects, at one end, a reciprocable piston rod 206 connected by pin means 208 to one end of the arm 50 on the lever 44. The opposite end of the master cylinder housing is connected by spherical pivot means 210, for example, to the vehicle frame 12.

The slave cylinder linear actuator 202 includes a housing 212 from which projects, at one end, a reciprocable piston rod 214 connected by pin means 216 to the end of the arm 59 of lever 56. The other end of the cylinder housing 212 is connected by spherical pivot means 218, for example, to the vehicle frame 12. A pair of hydraulic conduits 220 and 222 fluidly connect the master cylinder 200 to the slave cylinder 202 in a manner identical to the connection between the gear shift master cylinder 84 and the slave cylinder 94.

As the master cylinder piston rod 206 is retracted into the master cylinder 200 by linear displacement of the drive member 16, fluid is displaced between the master and slave cylinders 200 and 202 to either extend or retract the slave cylinder piston rod 214 relative to the slave cylinder housing 212 and to move the driven member 28 in a corresponding displacement. Similarly, when the drive member 16 is moved in the opposite direction, the master cylinder 200 causes the slave cylinder piston rod 214 to move the driven member 28 in the opposite direction in a corresponding linear displacement.

In the structures of FIGS. 1 and 2 the shift lever or handle 10 does not pivot for selecting a gear ratio. Such an arrangement is found on some motor vehicles, such as some race cars and sport cars. However the most common type of gear shift lever in use today on most motor vehicles provided with a floor-mounted shift lever consists of a shift lever 10, as shown at FIGS. 1(a) and 2(a), which is pivotable about two axes along the conventional H or double H shift pattern, a double H shift pattern being illustrated schematically at 15. Conventionally, remote gear shift mechanisms of this kind contemplate transmitting motion of the shift lever remotely to the transmission shift rail by means of levers, or cables, or a combination of both. The shift lever is pivotally supported from the frame or the body of the motor vehicle by a relatively complex mechanical assembly for transforming the lateral gear select motions and the longitudinal gear shift motions of the lever to linear motions resulting in push-pull motions being exerted on the end of the cables or levers.

For the sake of simplification, the shift lever 10 is illustrated at FIGS. 1(a) and 2(a) as consisting of an elongate stamping or leg 250 supported from the vehicle frame 12 by a ball and socket mount 252 enabling pivoting of the lever along crossed axes. A physical double H gate may also be provided, not shown, such that the pivoting motions of the shift lever 10 along the crossed axes are particularly well defined. A boot, not shown, covers the top portion of the shift lever leg 252 that projects above the floor of the vehicle.

In the arrangement of FIG. 1(a), the lower end of the lever leg 250 is attached to the end of the pushrod 88 of the hydraulic master cylinder 84, by way of the spherical pivot means 90. The conduits 104 and 106 of the master cylinder 84 are fluidly connected to the slave cylinder 94, FIG. 1, for operating the transmission shift rail 28 in rotation such as to effectuate the shifting into one of two gear ratios selected through the lateral pivoting motion of the shift lever 10. The gear select lateral pivoting motion of the shift lever 10, in the structure of FIG. 1(a), is transmitted to the L-shaped lever 44 by way of a rigid rod 254 having an end pivotably connected, as shown at 256, to the arm 48 of the L-shaped lever 44, and its other end connected by way of, for example, a ball and socket pivot member 258 to a bracket 260 disposed at right angle to the gear shift plane, consequently substantially in the plane of the gear select motion of the shift lever 10. The remaining of the mechanism is the same as that illustrated at FIG. 1.

In the structure of FIG. 2(a), the L-shaped lever 44 is connected, in the same manner as illustrated at FIG. 2, to the pushrod or piston rod 206 of the second, or gear select, master cylinder 200.

FIGS. 3-4 and 5-6 show alternative pivot connections that may be used either at the end of the cylinder housings, or at the end of the piston rods. FIGS. 3-4 illustrate, for example, the ball and socket pivot means 90 for connecting the arm 80 (FIGS. 1 and 2) to the piston rod 88 to move the rod 88 as the arm 80 is either being rotated or being moved linearly so that the pivot means 92, connected at the opposite end of the master cylinder 84, cooperates to accommodate such motion.

Referring to FIGS. 3-4, the arm 80 has an opening 300. A fastener 302 has a hexagonal head 304 and a narrowed, threaded end 306. The threaded end 306 forms a shoulder 308 which abuts one side of the arm 80. A nut 310 is mounted on the opposite side of the arm 80 to connect the fastener 302 to the arm 80.

An eye 312 is attached to the end of the piston rod 88. The eye has a concavely spherical annular bearing surface 314 for slidably receiving a spherical bearing 316 having a convexly spherical surface. The spherical bearing 316 has a bore 317 bonded to a metallic sleeve 318 which has a central bore 319 mounted over the cylindrical body 320 of the fastener 302.

A pair of washers 324 and 326 are disposed in engagement with the end faces of the spherical bearing member 316, such that when the fastener or bolt 302 and the nut 310 are tightened, with the end of the sleeve 318 and the shoulder 308 of the fastener engaging the side face of the arm 80, the spherical bearing 316 is held securely. As best shown at FIG. 4, the bore 317 through the spherical bearing 316 is eccentric such that when the spherical bearing 316 is rotated around the axis of the fastener or bolt 302, the longitudinal and lateral position of the eye 312 may be adjusted in order to compensate for manufacturing tolerances of the components, and to ensure that the motions provided by the master cylinder are faithfully duplicated by the slave cylinder output rod at the transmission end.

If so desired, the spherical bearing 316 may be made of hard rubber or of relatively resilient plastic such as to provide a shock absorbing connection between the moving parts of the assembly.

FIGS. 5-6 illustrate a modification in the form of a pivot assembly 400 which may be used to provide a pivotal connection at the end of the cylinder housing or at the end of the piston rods. The arm 80 (FIGS. 1 and 2), for example, has an opening 402 receiving the threaded end 404 of a fastener 406, such as a bolt. A lock washer 408 and a nut 410 fixedly attach the fastener or bolt 406 to the arm 80, the fastener or blt 406 having a diameter at its threaded end 404 smaller than the diameter of its cylindrical body portion 412 such as to form a shoulder 414 bearing against the side of the arm 80 opposite to that engaged by the lock washer 408 when the nut 410 is tightened. The piston rod 88 is provided with an enlarged flattened end 415 having a circular opening 416 in which is disposed the body portion of a spool-shaped hard rubber flexible bushing 418.

The spool-shaped bushing 418 has a pair of integral lateral flanges 419 such as to retain the end 415 of the piston rod 88 against lateral displacements. A metallic sleeve 420 is fitted in an eccentric aperture 421, as best shown at FIG. 6, in the spool-shaped bushing 418 such that by rotating the sleeve 420 around its common longitudinal axis 424 with the bolt 406 the longitudinal and lateral positions of the end 415 of the rod 88 may be adjusted in order to compensate for manufacturing tolerances of the components. When the bolt 406 and the nut 410 are tightened, the shoulder 414 of the bolt firmly engages one side of the lever 80, simultaneously with the end of the sleeve 420, and the bolt 406 and sleeve 420 are held in position such as to provide a firm anchoring for the bushing 418, a washer 422 disposed below the head of the bolt 406 preventing the bushing 418 from elastically passing over the head of the bolt.

Having thus described the invention, modification whereof will be apparent to those skilled in the art, what is claimed as new is as follows:

1. A gear select and shift mechanism for a motor vehicle having a transmission having a housing and including a select and shift rail having an operating portion positioned within said housing and an access portion positioned outside of said housing, said rail being axially movable for selection of a couple of gear ratios and being rotatably movable in opposite directions for shifting into a gear ratio, said mechanism comprising a manually operable shift lever located remotely from said transmission and motion transmitting means between said shift lever and said shift rail for axially displacing said shift rail and for rotating said shift rail in response to pivoting motion of said shift lever, said motion transmitting means for rotating said shift rail comprising a hydraulic master cylinder having a linearly displaceable input member connected to said shift lever for operating said input member by pivoting motion of said shift lever, a slave cylinder having a linearly displaceable output member connected to said access portion of said shift rail for rotating said shift rail in one of two opposite directions in response to linear displacement of said output member, and hydraulic link means interconnecting said master cylinder and said slave cylinder and operative to direct the hydraulic fluid discharged from said master cylinder in response to linear displacement of said input member to said slave cylinder and operative to direct the hydraulic fluid discharged from said slave cylinder in response to linear displacement of said output member to said master cylinder so that linear movement of said input member of said master cylinder produces corresponding linear movement of said output member of said slave cylinder so that pivoting movement of said shift lever produces rotation of said shift rail, said motion transmitting means for axially displacing said shift rail comprising a bracket adapted to be secured to said transmission housing proximate said shift rail, a first lever pivotally mounted on said bracket and engaging said shift rail access portion, and means operative in response to axial displacement of said shift lever to pivot said first lever on said bracket and axially displace said shift rail.

2. The gear select and shift mechanism for a motor vehicle of claim 1 wherein a second lever is attached to said transmission rail access portion and said slave cylinder output member is pivotally connected to said second lever.

3. The gear select and shift mechanism for a motor vehicle of claim 1 wherein the axial displacement of said shift lever is transmitted by cable means to said shift rail access portion for axial displacement of said shift rail.

4. The gear select and shift mechanism for a motor vehicle of claim 1 wherein said means for pivoting said first lever on said bracket in response to lateral displacement of said shift lever comprises a second master cylinder having an input member, means connecting said second master cylinder input member to said shift lever such that lateral motion of said shift lever correspondingly displaces said second master cylinder input member, a second slave cylinder fluidly connected to said second master cylinder, said second slave cylinder having an output member, and means pivotally connecting said second slave cylinder output member to said first lever.

5. The gear select and shift mechanism for a motor vehicle of claim 1 wherein said means attaching the end of said master cylinder input member to said shift lever comprises pivot means providing pivoting motion in all directions.

6. The gear select and shift mechanism for a motor vehicle of claim 1 wherein the end of said master cylinder opposite to the end provided with an input member is pivotally attached to said vehicle frame structure by pivot means providing pivoting in all directions.

7. The gear select and shift mechanism for a motor vehicle of claim 2 wherein the end of said slave cylinder output member is pivotally connected to said second lever by pivotal means providing pivoting in all directions.

8. The gear select and shift mechanism for a motor vehicle of claim 2 wherein the end of said slave cylinder opposite to the end provided with an output member is attached by pivotal means providing pivoting motion in all directions.

9. The gear select and shift mechanism for a motor vehicle of claim 5 wherein said pivot means has an eccentric axis of attachment for providing longitudinal and lateral adjustment of said attachment axis.

10. The gear select and shift mechanism for a motor vehicle of claim 6 wherein said pivot means has an eccentric axis of attachment for providing longitudinal and lateral adjustment of said attachment axis.

11. The gear select and shift mechanism for a motor vehicle of claim 7 wherein said pivot means has an eccentric axis of attachment for providing longitudinal and lateral adjustment of said attachment axis.

12. The gear select and shift mechanism for a motor vehicle of claim 8 wherein said pivot means has an eccentric axis of attachment for providing longitudinal and lateral adjustment of said attachment axis.

13. The mechanism of claims 5, 6, 7 or 8 wherein said pivotal means comprises a lug at said end, a partially spherical socket formed in said lug, a truncated spherical member disposed swivelly in said socket and having opposite planar faces projecting beyond said socket ends, an eccentric transverse bore extending from one of said faces to the other of said faces, and a mounting bolt passing through said bore for attaching said end to the associated mechanism structure.

14. The mechanism of claim 1 wherein said means operative in response to lateral displacement of said shift lever to pivot said first lever on said bracket comprises a cable connected at one end to said shift lever and at its other end to said first lever.

15. A mechanism according to claim 1 wherein said slave cylinder, master cylinder, and hydraulic link means interconnecting said master cylinder and slave cylinder comprise a pre-bled and pre-filled self-contained hydraulic apparatus to facilitate mounting in the vehicle on an automotive assembly line.

* * * * *